May 12, 1931.  E. D. LUKENBILL  1,804,627

SANITARY POURING CAP

Filed Feb. 16, 1929

INVENTOR.
EMERY D. LUKENBILL.
BY
ATTORNEYS.

Patented May 12, 1931

1,804,627

UNITED STATES PATENT OFFICE

EMERY D. LUKENBILL, OF INDIANAPOLIS, INDIANA

SANITARY POURING CAP

Application filed February 16, 1929. Serial No. 340,407.

This invention relates to a sanitary pouring spout for milk bottles and the like.

The chief object of this invention is to provide a pouring spout that will keep the milk contents of a bottle sanitary until such time as the contents are removed therefrom, and which will maintain such sanitary relation in the removal of the milk from the bottle.

The chief feature of the invention consists in the provision of a plurality of caps in relatively spaced relation, one of said caps being of sufficient size to completely close the neck of a milk bottle and be frictionally retained therein, said cap including a central relatively large aperture communicating at one end with a collapsible pouring spout, the other end of which is closed by a detachably connected cap that is preferably slightly smaller than the first mentioned cap.

Figure 1:
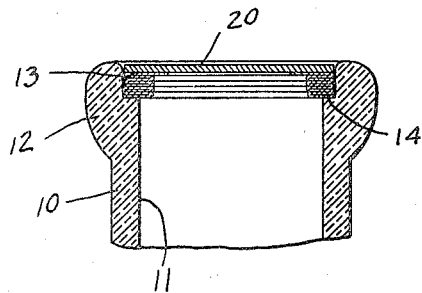
Figure 2:
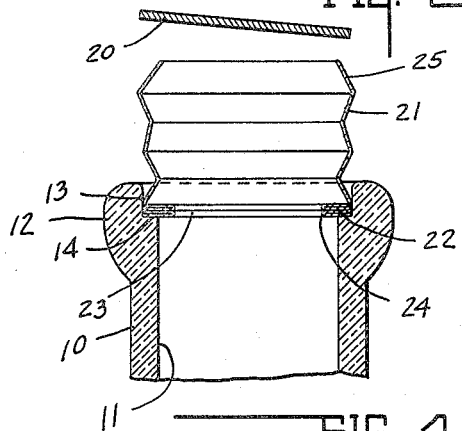
Figure 3:
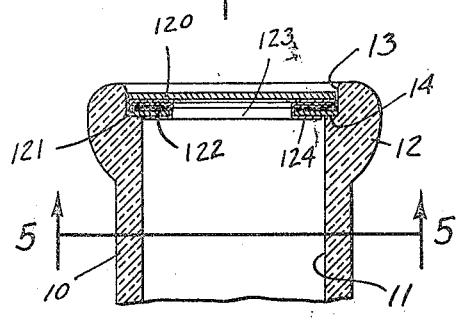
Figure 4:
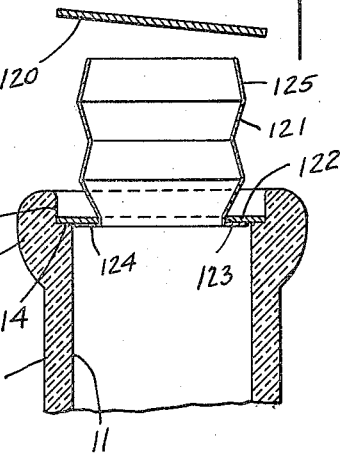
Figure 5:
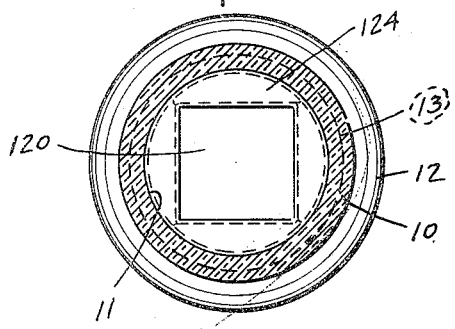
Figure 6:
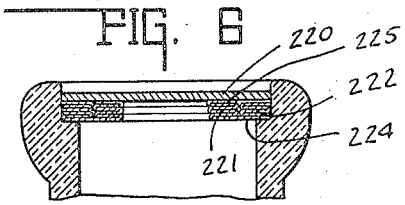
Figure 7:
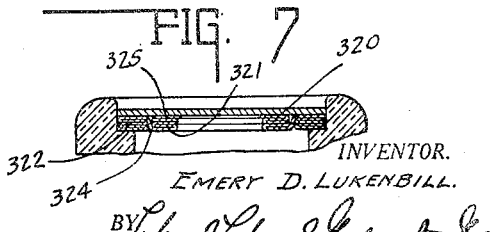
Figure 8:
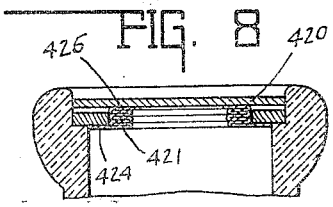

The full nature of the invention will be more fully understood from the accompanying drawings and the following description and claims:

In the drawings Fig. 1 is a central sectional view through the neck and mouth of a milk bottle the cap construction embodying the invention being shown mounted therein for sealing the same. Fig. 2 is a similar view with the cover cap removed and and the pouring spout in extended relation. Fig. 3 is a view similar to Fig. 1 but of a modified form of the invention. Fig. 4 is a view similar to Fig. 2 but of the modification shown in Fig. 3. Fig. 5 is a transverse sectional view taken on line 5—5 of Fig. 3 and in the direction of the arrows. Fig. 6 is a central section through the collapsed cap showing a modified form thereof wherein the spout is collapsed within the sealing cap aperture. Fig. 7 is a similiar view of a further modification thereof. Fig. 8 is a similiar view of a modification similar to Figs. 6 and 7 but similar to the form shown in Figs. 3 and 4 instead of similar to the forms shown in Figs. 1 and 2.

In the drawings 10 indicates the usual milk bottle neck having the passage 11 therethrough. Said neck terminates in a beaded portion 12 which constitutes the mouth. Said mouth includes a neck enlargement 13 and a flange or seat 14. This is the cap receiving seat. The aforesaid milk bottle construction is of the conventional or usual type.

In the packaging and dispensing of milk by bottle, the milk is kept sanitary up to the time it is received by the sterilized bottles. The milk is maintained sanitary in said bottle by the sanitary cap which is usually a single cap that frictionally seats in the neck of the bottle. The exterior of the necks of the bottles are usually moist, and from the time the driver or deliveryman receives the bottle from the bottling plant until it is placed in the bottle receiving receptacle at the customer's home, the exterior of the neck and the mouth of the bottle are subjected to a stream of bacteria, micro-organisms, dirt, and the like. Washing the neck of the bottle before removing the cap may remove the larger dirt particles and some of the bacteria, but it does not remove all of them, it has been demonstrated by experiment. To insure absolutely sanitary milk, and this is particularly desirable when the milk is used for infant feeding, the present invention is provided.

As previously stated the invention essentially consists of two caps detachably connected together by a collapsible pouring spout. The whole construction is receivable within and by the seat of the bottle mouth at present provided.

In Fig. 1 20 indicates a cap which is slightly less in diameter than the enlargement 13 so that it may be readily elevated therefrom by the use of some implement such as a knife, toothpick or even the finger nail. Attached to the same, and in the present disclosure the same is shown accordion plaited or bellows-like, is a collapsible pouring mouth or spout 21. The lower end of said spout is secured to a cap 22 which has a diameter at least as large and preferably slightly larger than the cap 20 so that it will frictionally seat in the neck enlargement 13 against the seat 14 as well known in the art. The cap 22 is centrally apertured as at 23 and in the form shown in Figs. 1 and 2 said central aperture is circular and concentric with the periphery of the cap.

In the form of the invention shown in Figs. 1 and 2 the bottom cap is formed by compressing or ironing into cap formation several folds 24 of a tube. The folds or plaits 24 are preferably of slightly greater diameter than the folded or plaited portion 21 of the tube so that the spout is readily collapsible within the neck enlargement 13. The top fold 25 is suitably secured to the top cap 20 as by heating or adhesive so that the spout will elongate when the cap 20 is removed. Before the cap 22 is removed, the cap 20 is detached from the supporting spout and then the contents of the bottle can be poured from the same through cap 22 without having any portion running over and back along the exterior of the bottle or cap, and thus contacting a non-sterile surface.

After the bottle has reached the house-holder the danger of additional exterior contamination practically ceases so that all the house-holder has to do is to extend the spout 25 and pour from the bottle. Of course the cap 20 after being detached from the spout 21 may be replaced as a cover if desired, or any other suitable detachable cover may be substituted as is well known.

The spout and caps are made of paraffin paper so that the application of heat will at the proper time and place, and in the proper amount, serve to secure the folds 24 together and to secure the outer fold 25 to the cap 20. The thickness of the two caps with the interposed spout may be such that it can be accommodated by the standard milk bottle capping machines.

In Figs. 3 to 5 inclusive a modified form of the invention is illustrated. In said figures 120 indicates the top cap and 122 the the bottom cap suitably apertured as at 123. The spout 121 has its upper fold 125 suitably secured to the top cap by ironing or the like, if or paraffin paper or by adhesive. An extension 124 extends through the cap aperture 123 and is turned outwardly as at 124a and is suitably secured to the under surface of the inner cap 122.

In Fig. 6 similar parts bear the same number but of the 200-series. In this form of the invention the plaited cap 221 is telescopically received by the apertured cap 222 formed by folding and pressing. In this form of the invention the tube is of two different diameters and the intermediate portion forms the connecting link, and as shown in Fig. 6 the connecting portion is positioned at the bottom and is indicated at 224.

In Fig. 7 a similar modified form of the invention is illustrated and similar parts bear like numerals of the 300-series. In this form of the invention, however, the connection 324 is attached to the apertured cap at the top thereof instead of at the bottom. This form of the invention is similar to that shown in Fig. 6 in that the collapsible spout is likewise telescopic relative to the apertured cap.

In Fig. 8 a modified form of the invention is illustrated wherein similar parts bear numerals of the 400-series and in this instance the apertured cap is similar to the cap shown in Figs. 3 to 5 inclusive. The plaited spout 421 is similar to that shown in Figs. 6 and 7 and is likewise telescopic. The lower end of the spout is secured in this instance to the lower portion of the apertured cap as at 424 while the upper portion of the spout is secured to the upper cap 420 by the last element 425 of the spout.

In place of the accordion plaited cap a spirally plaited cap may be employed. The upper cap 20 and 120 need not necessarily be substantially as large as the lower cap, but should be large enough to completely close or cover the spout opening. The present construction in addition to preventing the contents in pouring from passing over a non-sterile surface also prevents the contents from contacting a non-sterile or dirty bottle seat, should the bottle washing machine fail to remove all the incrustations or deposits thereon.

All claims read upon the form illustrated in Fig. 6. All claims likewise read upon the spiral modification of the preceding paragraph.

The invention claimed is:

1. A unitary sealing and sanitary pouring cap construction of substantially standard cap dimensions for standard capping machine application to milk bottles and the like, comprising a base seatable in the cap seat of the bottle mouth and having an aperture therethrough spaced from the peripheral edge of the cap, a collapsible pouring spout secured to the base and in registration with the base aperture and having an open sterile mouth, and a cover detachably associated with the spout for maintaining the sterility of the open mouth of the spout until separated therefrom for non-contaminating pouring, said base, spout and cover being simultaneously applied to the bottle in a single capping operation.

2. A unitary sealing and sanitary pouring cap construction of substantially standard cap dimensions for standard capping machine application to milk bottles and the like, comprising a base seatable in the cap seat of the bottle mouth and having an aperture therethrough spaced from the peripheral edge of the cap, a collapsible pouring spout secured to the base and in registration with the base aperture and having an open sterile mouth, and a cover detachably associated with the spout for maintaining the sterility of the open mouth of the spout until separated therefrom for non-contaminating pouring, said base, spout and cover being simultaneously applied to the bottle in a single capping operation, said cover being substantially the same outline and area as the base.

3. A unitary sealing and sanitary pouring cap construction of substantially standard cap dimensions for standard capping machine application to milk bottles and the like, comprising a base seatable in the cap seat of the bottle mouth and having an aperture therethrough spaced from the peripheral edge of the cap, a collapsible pouring spout secured to the base and in registration with the base aperture and having an open sterile mouth, and a cover detachably associated with the spout for maintaining the sterility of the open mouth of the spout until separated therefrom for non-contaminating pouring, said base, spout and cover being simultaneously applied to the bottle in a single capping operation, said spout being of a folded automatic extensible type, the automatic extension being obtained simultaneously with and by the manual removal of the cover for maintaining the sterility of the spout mouth.

4. A unitary sealing and sanitary pouring cap construction of substantially standard cap dimensions for standard capping machine application to milk bottles and the like, comprising a base seatable in the cap seat of the bottle mouth and having an aperture therethrough spaced from the peripheral edge of the cap, a collapsible pouring spout secured to the base and in registration with the base aperture and having an open sterile mouth, and a cover detachably associated with the spout for maintaining the sterility of the open mouth of the spout until separated therefrom for non-contaminating pouring, said base, spout and cover being simultaneously applied to the bottle in a single capping operation, said spout being of a folded automatic extensible type, the automatic extension being obtained simultaneously with and by the manual removal of the cover for maintaining the sterility of the spout mouth, said cover being substantially the same outline and area as the base.

5. A unitary sealing and sanitary pouring cap construction of substantially standard cap dimensions for standard capping machine application to milk bottles and the like, comprising a base seatable in the cap seat of the bottle mouth and having an aperture therethrough spaced from the peripheral edge of the cap, a collapsible pouring spout secured to the base and in registration with the base aperture and having an open sterile mouth, and a cover detachably associated with the spout for maintaining the sterility of the open mouth of the spout until separated therefrom for non-contaminating pouring, said base, spout and cover being simultaneously applied to the bottle in a single capping operation, said apertured base being formed of a plurality of tubular plaited portions of a large diameter, and said spout being formed of a plaited tubular portion of a smaller diameter, said spout being telescopically associated with said apertured base.

6. A unitary sealing and sanitary pouring cap construction of substantially standard cap dimensions for standard capping machine application to milk bottles and the like, comprising a base seatable in the cap seat of the bottle mouth and having an aperture therethrough spaced from the peripheral edge of the cap, a collapsible pouring spout secured to the base and in registration with the base aperture and having an open sterile mouth, and a cover detachably associated with the spout for maintaining the sterility of the open mouth of the spout until separated therefrom for non-contaminating pouring, said base, spout and cover being simultaneously applied to the bottle in a single capping operation, said apertured base being formed of a plurality of tubular plaited portions of a large diameter, and said spout being formed of a plaited tubular portion of a smaller diameter, said spout being telescopically associated with said apertured base, the spout and apertured base being connected together at the bottom of the base.

7. A unitary sealing and sanitary pouring cap construction of substantially standard cap dimensions for standard capping machine application to milk bottles and the like, comprising a base seatable in the cap seat of the bottle mouth and having an aperture therethrough spaced from the peripheral edge of the cap, a collapsible pouring spout secured to the base and in registration with the base aperture and having an open sterile mouth, and a cover detachably associated with the spout for maintaining the sterility of the open mouth of the spout until separated therefrom for non-contaminating pouring, said base, spout and cover being simultaneously applied to the bottle in a single capping operation, said extensible spout being telescopically receivable by the base aperture.

8. A unitary sealing and sanitary pouring cap construction of substantially standard cap dimensions for standard capping machine application to milk bottles and the like, comprising a base seatable in the cap seat of the bottle mouth and having an aperture therethrough spaced from the peripheral edge of the cap, a foldable pouring spout secured at one end to the base and in registration with the base aperture and having a sterile pouring edge when arranged in spout formation, and a cover detachably associated with the spout pouring edge for completely covering the entire exposed pouring edge until separated therefrom for non-contaminated pouring, said base, spout and cover being simultaneously applied to the bottle in a single capping operation.

In witness whereof, I have hereunto affixed my signature.

EMERY D. LUKENBILL.